April 19, 1966  H. J. KOZICKI  3,246,716
VEHICLE SUSPENSION SYSTEM
Filed Oct. 29, 1963  2 Sheets-Sheet 1

HENRY J. KOZICKI
INVENTOR.

BY J. R. Faulkner
J. D. Beck
ATTORNEYS

April 19, 1966  H. J. KOZICKI  3,246,716
VEHICLE SUSPENSION SYSTEM
Filed Oct. 29, 1963  2 Sheets-Sheet 2
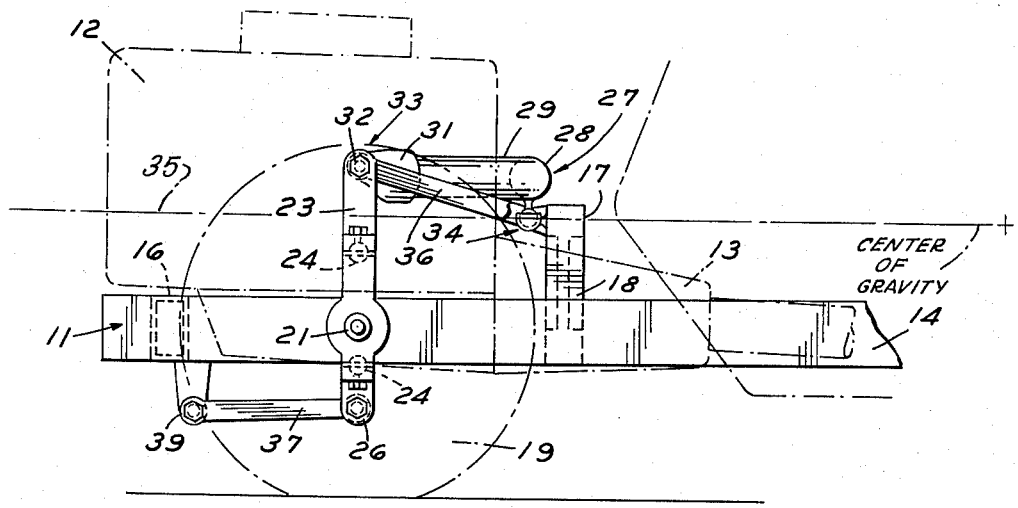
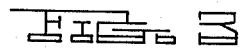
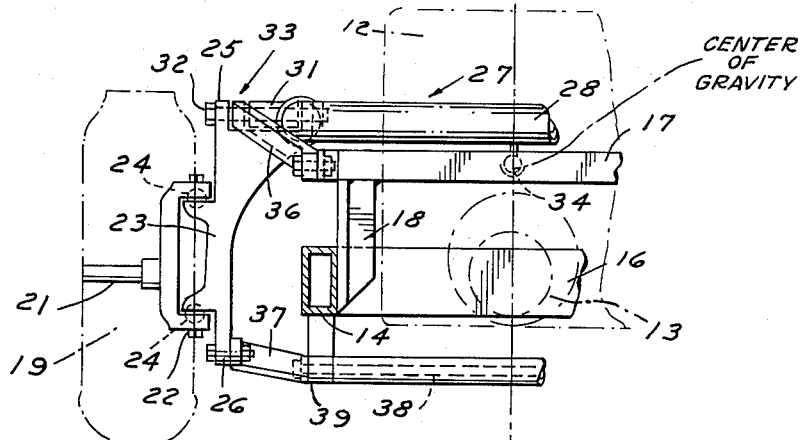
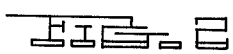
HENRY J. KOZICKI
INVENTOR.
BY
J. R. Faulkner
J. D. Beck
ATTORNEYS United States Patent Office 3,246,716
Patented Apr. 19, 1966

3,246,716
VEHICLE SUSPENSION SYSTEM
Henry J. Kozicki, Orchard Lake, Mich., assignor to Ford Motor Company, Dearborn, Mich., a corporation of Delaware
Filed Oct. 29, 1963, Ser. No. 319,864
9 Claims. (Cl. 180—64)

This invention relates to vehicle suspension systems and more particularly to an improved solid axle front suspension for motor vehicles.

Independent suspensions have been found to give generally good riding characteristics for modern vehicles but excessive body roll may be encountered when the vehicle is cornering. To counter body roll, the two independently mounted wheels are usually interconnected by a sway bar. Unfortunately, the utilization of a sway bar effects an increase in wheel rates which prevents suspension engineers from giving the motoring public the soft ride they have demanded, especially in luxury vehicles.

Solid axle front suspensions had been used extensively in motor vehicles prior to the advent of independent front suspensions as they were relatively simple, low in cost, and economical to maintain. It has been found that certain undesirable characteristics such as body roll, wheel shimmy, and body shake may result when the vehicle is travelling at certain high speeds readily achieved with modern vehicles. Body roll can be overcome to some extent by articulately connecting the solid axle to the chassis at a point above a lateral axis passing through the center of the road wheels to raise the roll center of the vehicle. This, in turn, may bring about side chuck which can be described as follows:

As one wheel encounters a bump and is driven upwardly, it rotates about the other road wheel which is still on the level ground. Such movement is therefore lateral as well as in a vertical direction. In a vehicle having a high, effective roll center, this will result in the sideways movement of the vehicle body that can be readily felt by the occupants, causing objectionable discomfort as the vehicle travels on bumpy roads.

As passenger vehicle development progressed, the motoring public demanded greater safety and comfort which led to the replacement of solid axle suspensions with the current independent front suspensions. Ever since, automotive engineers have been trying to design a vehicle suspension system that is relatively low in cost, easy to maintain, and still provides a comfortable ride.

Accordingly, it is one of the principal objects of this invention to provide a solid axle suspension having the advantages of low cost and rigidity and at the same time overcoming or reducing the effects of most of the undesirable features usually associated with solid axle suspension systems of the past which made them obsolete.

In a preferred embodiment of this invention, a pair of road wheels are rotatably mounted on spindle members with each spindle member being disposed on opposite sides of a vehicle frame. A spindle support member is connected to each spindle member. A solid axle is provided which has an elevated center portion that extends transversely of the vehicle. The center portion of the solid axle is universally connected to the vehicle frame at a point longitudinally and rearwardly spaced from the spindle members. The outer extremities of the solid axle are pivotally connected to the upper portion of each spindle support member. Radius arms extending in diagonally opposite directions pivotally connect the upper and lower portions of each spindle support member to the vehicle frame.

The universal connection between the solid axle and the vehicle frame, which acts as the roll center for the vehicle, lies rearwardly of the spindle support members. Thus, when one wheel rises in jounce, the other wheel remains fixed to the road with the universal joint acting as one point of a center line of wheel motion while a second point of the center line can be determined by the ground contact point of the other wheel. This type of wheel motion will bring about a considerable reduction in the lateral movement between the wheel and the road and thereby reduce the side chuck.

The universal connection of the solid axle is positioned to lie at a point even with or above the center of gravity of the vehicle. This will prevent body roll when the vehicle is cornering. The radius arms connecting the spindle support members to the vehicle frame constitute upper and lower suspension arms and are arranged to provide proper antidive geometry.

A further object of this invention is to provide a solid axle front suspension which has a high roll center to prevent body roll when the vehicle is cornering and at the same time assist in the control of side chuck.

A further object of this invention is to provide a vehicle suspension system that is substantially low in cost and can be maintained at its optimum operating level without requiring extension adjustment.

Other objects and advantages of this invention will become more apparent from the following description when viewed in connection with the accompanying drawings in which:

FIGURE 2 is a rear elevational view of only one side portion of the suspension system shown in FIGURE 1 as both sides are identical; and, FIGURE 3 is a side elevational view of the suspension system shown in FIGURE 1.

Figure 1:
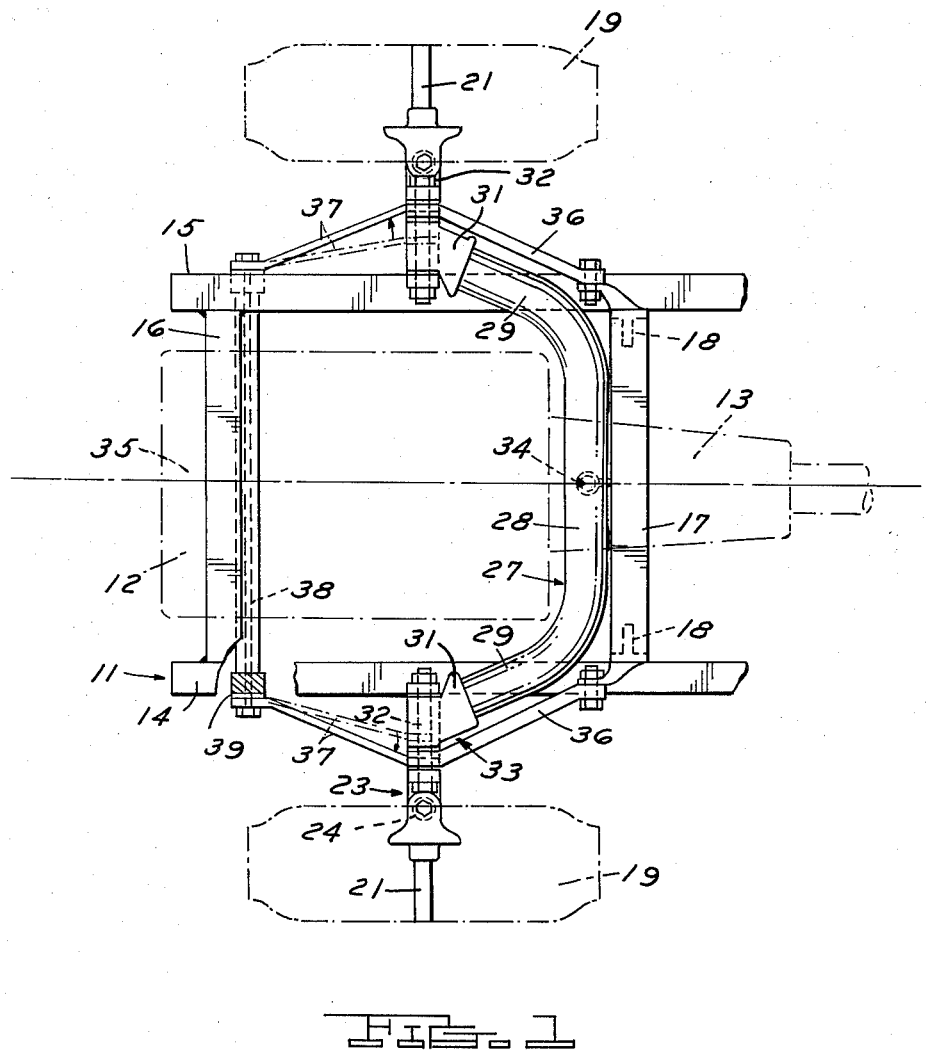
FIGURE 1 is a plan view of a portion of the chassis of a motor vehicle incorporating a preferred embodiment of the suspension system of this invention.

Referring now to the drawings, FIGURE 1 discloses a portion of the vehicle frame 11 supporting an automotive engine 12 and a transmission 13, the latter two being shown in dot and dash lines. It is to be understood that the suspension system of this invention is equally suited to vehicles of unit body construction in which the frame 11 is replaced by structural members integrally formed or attached to the vehicle body.

The frame 11 on which a vehicle body is readily mounted comprises longitudinally extending side rails 14 and 15. One transversely extending cross member 16 and a second transversely extending cross member 17 connect the side rails 14 and 15 forwardly and rearwardly of the engine 12, respectively. The cross member 17 is elevated by two vertically extending brackets 18 so that it passes over the transmission 13.

Left and right road wheels 19 for the vehicle are spaced outwardly of the side rails 14 and 15. The wheels 19 together with the suspension system of this invention form the unsprung portion of the vehicle. As best seen in FIGURE 2, each wheel 19 is rotatably supported on a spindle member 21. Each spindle member 21 is formed with an inwardly extending yoke 22. A spindle support member 23 is connected by ball and socket joints 24 to the yoke 22 of each spindle member 21. A line passing through the center of the joints 24 forms an axis about which the wheels may turn for steering purposes.

The portion of the spindle support 23 extending above the spindle member 21 has a bifurcated hinge support 25 while the lower portion is provided with a downwardly projecting flange 26.

A solid axle, designated as 27, extends transversely of the vehicle to pass over the transmission 13 at a point even with or above the center of gravity of the vehicle. The axle 27, which is of tubular construction in this instance, comprises a raised center segment 28 that is longitudinally rearwardly spaced from the wheel spindles 21. This center segment 28 is integrally formed with two diagonally extending outer end portions 29. A hinge socket 31 is securely attached to the outer extremity of each outer end portion 29. This hinge socket 31 is positioned between the bifurcated hinge support 25 and connected thereto by a pivot pin 32 to define an articulated connection 33. Connections 33, which lie in a vertical alignment with a line passing through the centers of wheels 19, permit pivotal movement of each spindle support 23 with respect to the axle 27.

The center of the center segment 28 is connected by a ball and socket joint 34 to the second cross member 17. This universal connection between the axle 27 and the sprung portion of the vehicle is positioned even with or above the center of gravity of the vehicle. The longitudinal roll axis for the vehicle, designated as 35, is assumed to extend through the ball and socket joint 34 which serves as the roll center.

A first radius arm 36 and a second radius arm 37 are provided to connect each spindle support 23 to the frame 11. The first radius arm 36 has one end pivotally connected to the upper portion of the spindle support 23 and extends diagonally rearwardly and inwardly therefrom to pivotally connect to the cross member 17.

The second radius arm 37 has one end pivotally connected to the flange 26 at the lower portion of the spindle support 23. The radius arm 37 extends diagonally forwardly and inwardly from the flange 26 to pivotally connect to one end portion of a torsion bar 38. The torsion bar 38 extends laterally through two bushings 39 attached to the underside of side rails 14 and 15 near the front of the vehicle and then connects to the radius arm 37 on the other side. The torsion bar 38 in this instance provides a resilient support between the wheel assemblies and the frame 11, but other spring means such as coil springs (not shown) may complement or replace the torsion bar 38 for this purpose. The radius arms 36 and 37 are preferably single leaf spring members having their main dimension in a vertical plane.

The articulated connection 33 between the upper portion of the spindle support 23 and the outer extremity of the axle 27 is the most heavily loaded element in the suspension system of this invention as the moment created by the ground reaction is resisted by the outer end portion 29 at this hinge. To partially overcome this moment, the radius arm 37 may be first pivotally connected to a bracket 39 so that it will assume the free position as shown in dash lines in FIGURE 1. Then the rearward facing other end of the radius arm 37 is pulled outwardly towards the wheel 19 before being connected to the flange 26 at the lower end of the spindle support 23. This will result in a laterally inward force acting on the lower portion of the spindle support 23 to counter the moment created by the upward movement of the wheel 19, thereby partially unloading the articulated connection 33.

The steering linkage for the vehicle can be attached to the lower portion of each spindle member 21 in a conventional manner and therefore is not shown.

From the foregoing description it can be readily understood that no tread or camber change takes place as each wheel is maintained in a substantially parallel relationship to each other by the solid axle 27 interconnecting the spindle supports 23. This substantially improves the cornering ability of the vehicle as the camber change during roll usually associated with independent suspension is eliminated. If desired, some small tread and camber angle may be introduced by inclining the pivotal axis of the articulated connections 33 with respect to the horizontal plane of the vehicle and a line passing through the centers of both road wheels when viewed from above, respectively.

In a motor vehicle equipped with the modified solid axle suspension of this invention, the vehicle body does not roll as the ball and socket joint 34 serving as the roll center lies on or above the center of gravity of the vehicle. Side chuck is reduced to a point where it has no detrimental effect on the occupants of the vehicle as the ball and socket joint 34 is positioned a considerable distance behind the spindle members 21. This will reduce the lateral forces acting on the vehicle body.

The utilization of two pairs of diagonally extending spring-type radius arms 36 and 37 to pivotally connect the support member 23 to the frame 11 will assist in reducing shimmy and at the same time absorb brake and acceleration thrusts. Also, the radius arms 36 and 37 may be angularly disposed so as to introduce proper antidive geometry.

Other advantages effected by the installation of the suspension system of this invention lie in its construction as no lower suspension arms are required as in current independent-type spring suspensions. This not only simplifies the conventional steering linkage connections but permits greater latitude to the automotive engineer in the mounting of engine accessories and in the design and sizing of the engine itself as interference with suspension components is minimized.

It will be understood that the invention is not to be limited to the exact construction shown and described but that various changes and modifications may be made without departing from the spirit and scope of the invention as defined in the appended claims.

What is claimed is:

1. A motor vehicle having a frame structure, a pair of laterally spaced wheel support assemblies upon which said frame structure is spring supported, a road wheel rotatably mounted on each of said wheel support assemblies, an axle extending generally transversely of said vehicle at a level even with or above the center of gravity of the motor vehicle, said axle having its center portion universally connected to said frame structure of said vehicle at a point longitudinally spaced from said wheel support assemblies, the outer ends of said axle being pivotally connected to said wheel support assemblies by pivot means providing a transverse pivot axis, and radius arms, each radius arm having one end connected to one of said wheel support assemblies and its other end connected to said structure of said vehicle.

2. A motor vehicle having a frame structure, a pair of laterally spaced road wheels, support means for each of said road wheels upon which said frame structure is resiliently supported, a rigid axle extending generally transversely of said vehicle having its center portion longitudinally spaced from a transverse axis passing through the center of said pair of road wheels, said center portion being universally connected to said frame structure at a level even with or above the center of gravity, the outer ends of said axle being pivotally connected to each of said support means by pivot means providing a transverse pivot axis, and generally longitudinally extending radius arms, each radius arm having one end pivotally connected to said frame structure of the vehicle and its other end connected to said support means.

3. A motor vehicle having a vehicle body mounted on a frame, a pair of laterally spaced road wheels mounted on spindle members, each road wheel being disposed on opposite sides of said frame, generally vertically extending support means for each road wheel resilient means supporting said frame on said support means, a solid axle having two end portions and a center portion extending generally transversely of said vehicle, each end portion being pivotally connected to each of said vertical support means for pivotal movement about an axis extending transversely of said vehicle, said center portion being universally connected to said frame at a level even with or above the center of gravity of said vehicle, and generally longitudinally extending radius arms, each radius arm having one end pivotally connected to said frame and its other end pivotally connected to one of said vertical support means.

4. A motor vehicle having a vehicle body mounted on a frame, a pair of laterally spaced road wheels, generally vertically extending support means for each wheel, said frame being resiliently supported on said support means, a solid axle having two end portions and a center portion extending generally transversely of said vehicle, said center portion being longitudinally spaced from said vertical support means and being universally connected to said frame at a level even with or above the center of gravity of the motor vehicle, the outer extremities of the end portions of said solid axle being connected to each of said vertical support means for pivotal movement about an axis extending traversely of said vehicle, a pair of radius arms for each support means, said pair of radius arms having one end pivotally connected to said support means and the other end pivotally connected to said frame at points spaced in a longitudinally opposite direction from said support means.

5. A motor vehicle having a vehicle body, engine and transmission mounted on a frame, a pair of road wheels rotatably mounted on spindle members, each road wheel being disposed on opposite sides of said frame, a vertically extending spindle support means pivotally connected to each spindle member, a solid axle having two end portions and a center portion, said center portion extending generally transversely of said vehicle and positioned at or above the level of the center of gravity of said vehicle, said center portion being longitudinally and rearwardly spaced from said spindle members, the center of said portion being universally connected to said frame, the outer extremity of each end portion being connected to each of said spindle support means for pivotal movement about an axis extending transversely of said vehicle and in vertical alignment with a line passing through the centers of said road wheels, and a pair of generally longitudinally extending radius arms for each side of said vehicle, each pair of radius arms having one end pivotally connected to each spindle support means and its other end pivotally connected to said frame at points spaced in a longitudinally opposite direction from said one end, said frame resiliently supported on said radius arms.

6. A motor vehicle having a vehicle body, engine and transmission mounted on a frame, a pair of road wheels rotatably mounted on spindle members, each road wheel being disposed on opposite sides of said frame, vertically extending spindle support means pivotally connected to said spindle members, a solid axle having two end portions and a center portion, said center portion extending generally transversely of said vehicle and raised to pass above said transmission at a point even with or above the center of gravity of said vehicle, each end portion being connected to the upper portion of each vertical spindle support means for pivotal movement about an axis extending transversely of said vehicle and in vertical alignment with a line passing through the centers of said road wheels, said center portion universally connected to said frame at a point lying on the longitudinal center axis of said vehicle and spaced longitudinally rearwardly from said transverse axis, generally longitudinally extending radius arms, one of said radius arms having one end pivotally connected to the upper portion of each of said spindle support means and its other end pivotally connected to said frame, another of said radius arms having one end pivotally connected to the lower portion of each of said spindle support means and its other end pivotally connected to said frame at a point longitudinally opposite from the other end of said one of the radius arms, said frame resiliently supported on said radius arms.

7. A motor vehicle having a vehicle body, an engine and a transmission mounted on a frame, a pair of road wheels rotatably mounted on spindle members, each road wheel being disposed on opposite sides of said frame, vertically extending spindle support members pivotally connected to said spindle members, a solid axle having a center portion extending generally transversely of said vehicle and passing over said transmission at a point at least level with the center of gravity of said vehicle, said structural member having two end portions integrally formed with said center portion, the outer extremity of each end portion connected to the upper portion of said vertical support means for pivotal movement about an axis extending transversely of said vehicle and in vertical alignment with a line passing through the centers of said pair of road wheels, said center portion being universally connected to said frame at a point spaced longitudinally rearwardly from said transverse axis and lying on the center longitudinal axis of said vehicle, a pair of radius arms for each spindle support member, one of said radius arms having one end pivotally connected to the upper portion of said spindle support member and extending diagonally inwardly in a rearward direction therefrom with its other end being pivotally connected to said frame, the other of said radius arms having one end pivotally connected to the lower portion of said spindle support member and extending diagonally inwardly in a forward direction with its other end being pivotally connected to said frame, said frame being resiliently mounted on said radius arms.

8. The structure as described in claim 7 and which is further characterized in that said other of the radius arms is a single leaf spring member with its main section disposed vertically.

9. The structure as described in claim 7 and which is further characterized in that said other of the radius arms is a single leaf spring member having its main section disposed vertically, said other of the radius arms being bent outwardly before one end thereof is pivotally connected to the lower portion of said spindle support member to provide an inward force on the lower portion of said spindle support member after being pivotally connected thereto.

References Cited by the Examiner

UNITED STATES PATENTS

| 2,138,438 | 11/1938 | Wagner | 280—124 |
| 2,256,069 | 9/1941 | Wagner | 267—57 |
| 2,753,190 | 7/1956 | Hooven | 280—112 |
| 2,965,185 | 12/1960 | Marchetti | 280—106.5 X |
| 3,105,699 | 10/1963 | Peras | 280—91.2 |
| 3,174,771 | 3/1965 | Muller | 267—19 X |

BENJAMIN HERSH, *Primary Examiner.*

MILTON L. SMITH, *Examiner.*